(12) United States Patent
Kneisley et al.

(10) Patent No.: US 9,851,800 B1
(45) Date of Patent: Dec. 26, 2017

(54) EXECUTING COMPUTING TASKS BASED ON FORCE LEVELS

(75) Inventors: Gabriel Benjamin Kneisley, Spring Hill, KS (US); Cary Ann Moody, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1534 days.

(21) Appl. No.: 11/934,924

(22) Filed: Nov. 5, 2007

(51) Int. Cl.
*G06F 3/01* (2006.01)

(52) U.S. Cl.
CPC .............. *G06F 3/017* (2013.01); *G06F 3/011* (2013.01); *G06F 2203/04104* (2013.01); *G06F 2203/04105* (2013.01)

(58) Field of Classification Search
USPC .................................. 345/173, 156–157, 169
See application file for complete search history.

(56) References Cited

U.S. PATENT DOCUMENTS

| | | | |
|---|---|---|---|
| 5,995,026 A * | 11/1999 | Sellers | 341/34 |
| 7,663,607 B2 | 2/2010 | Hotelling et al. | |
| 7,808,488 B2 * | 10/2010 | Martin et al. | 345/169 |
| 2005/0226505 A1 | 10/2005 | Wilson | |
| 2006/0044280 A1 * | 3/2006 | Huddleston et al. | 345/173 |
| 2006/0070084 A1 | 3/2006 | Novik et al. | |
| 2006/0197750 A1 | 9/2006 | Kerr et al. | |
| 2007/0052674 A1 | 3/2007 | Culver | |
| 2007/0236478 A1 | 10/2007 | Geaghan et al. | |
| 2008/0012835 A1 | 1/2008 | Rimon et al. | |
| 2008/0087476 A1 * | 4/2008 | Prest et al. | 178/18.01 |
| 2008/0092245 A1 | 4/2008 | Alward et al. | |
| 2008/0167832 A1 | 7/2008 | Soss | |
| 2008/0209442 A1 | 8/2008 | Setlur et al. | |
| 2008/0214263 A1 * | 9/2008 | Walker et al. | 463/16 |
| 2009/0213061 A1 | 8/2009 | Yasuda | |
| 2010/0045627 A1 | 2/2010 | Kennedy | |
| 2012/0123864 A1 * | 5/2012 | Mueller et al. | 705/14.53 |

OTHER PUBLICATIONS

Hrvoje Benko et al., "Precise Selection Techniques for Multi-Touch Screens," CHI 2006 Proceedings, Interacting with Large Surfaces, Apr. 22-27, 2006, Montreal, Quebec, Canada, pp. 1263-1272.

(Continued)

*Primary Examiner* — William Boddie
*Assistant Examiner* — Leonid Shapiro

(57) ABSTRACT

A method, medium, and system are provided for executing computing tasks based on force measurements corresponding to user interactions with a touch screen for a computing device. The touch screen displays content for applications executed by the computing device and receives user interactions. The computing device processes the user interactions to detect force measurements and to associate the force measurements with computing tasks for the applications executed on the computing device. A database stores the force measurements and corresponding computing tasks to identify matches between the stored force measurement for a user and subsequent force measurements received when the touch screen receives additional user interactions. When matching force measurements are located in the database, the corresponding computing tasks are executed by the computing device.

4 Claims, 5 Drawing Sheets

(56) References Cited

OTHER PUBLICATIONS

David Ahlstrom et al., "An Evaluation of Sticky and Force Enhanced Targets in Multi Target Situations," NordiCHI 2006, Oct. 14-18, 2006, Oslo, Norway, pp. 58-67.
Stephen Brewster, et al., "Tactile Feedback for Mobile Interactions," CHI 2007 Proceedings, Mobile Interactions, Apr. 28-May 3, 2007, San Jose, CA, pp. 159-162.
Gonzalo Ramos et al., "Pressure Marks," CHI 2007 Proceedings, Alternative Interactions, Apr. 28-May 3, 2007, San Jose, CA, pp. 1375-1384.
Andrew Sears et al., "Touchscreen Field Specification for Public Access Database Queries: Let Your Fingers Do the Walking," University of Maryland, College Park, Maryland, 1990 ACM, pp. 1-7.
Richard L. Potter et al., "Improving the Accuracy of Touch Screens: An Experimental Evaluation of Three Strategies," CHI '88, University of Maryland, College Park, Maryland, 1988 ACM, pp. 27-32.
Par-Anders Albinsson et al., "High Precision Touch Screen Interaction," CHI 2003, Ft. Lauderdale, FL, Apr. 5-10, 2003, vol. No. 5, Issue No. 1, pp. 105-112.
Daniel Vogel et al., "Shift: A Technique for Operating Pen-Based Interfaces Using Touch," CHI 2007 Proceedings: Mobile Interaction Techniques 1, Apr. 28-May 3, 2007, San Jose, CA, pp. 657-666.
Office Action in U.S. Appl. No. 11/934,902 dated Dec. 23, 2010.
Office Action in U.S. Appl. No. 11/934,918 dated Dec. 23, 2010.
Final Office Action in U.S. Appl. No. 11/934,918 dated Jun. 7, 2011, 13 pages.
Final Office Action in U.S. Appl. No. 11/934,902 dated Jun. 7, 2011, 10 pages.
Non Final Office Action dated Feb. 12, 2014 in U.S. Appl. No. 11/934,918, 20 pages.
Non-Final Office Action dated Jul. 11, 2014 in U.S. Appl. No. 11/934,918, 11 pages.
Final Office Action dated Dec. 11, 2014 in U.S. Appl. No. 11/934,918, 10 pages.
Final Office Action dated May 21, 2015 in U.S. Appl. No. 11/934,918, 11 pages.

\* cited by examiner

EXECUTING COMPUTING TASKS BASED ON FORCE LEVELS

INTRODUCTION

Conventionally, users interact with a computing system through an input device. The input device may include a keyboard device, a pointer device, or a touch screen. The conventional input device provides performance support for users that interact with the computing system. The conventional input device may allow the user to enter text, zoom-in, zoom-out, make selections, and quickly complete numerous computing tasks. However, when a user employs a conventional touch screen to initiate the computing tasks, the performance support of the touch screen may become burdensome, slow, or error-prone.

SUMMARY

The invention is defined by the claims below. Embodiments of the invention provide a system, method, and media for, among other things, detecting force measurements for a touch screen and triggering a computing task based on the detected force measurements. The present invention has several practical applications in the technical arts including the following: efficient text entry on a touch screen, reducing complexities for triggering one or more computing tasks based on a user's interaction with a touch screen, and associating the detected force measurements with the user of the touch screen.

In a first aspect, a method to identify force measurements for user interaction with a touch screen on a computing device is provided. The surface of the touch screen receives interactions from a user. In turn, force measurements for the user interactions are generated by stress sensors mounted on the touch screen. The generated force measurements are associated with computing tasks for applications executing on the computing device. The generated force measurements and the computing tasks are stored in a database with an identifier for the user.

In a second aspect, a method to detect distortions that trigger a computing task on a touch screen of a computing device is provided. The touch screen receives interactions from a user and captures touch shapes for the user interactions. The touch shapes are processed by the computing device to determine force levels based on detected distortions of the touch shapes. The computing device associates the determined force levels and touch shapes with computing tasks. When subsequent user interactions having similar touch shapes and distortions are received by the touch screen, the computing device executes the computing tasks.

In a third aspect, one or more computer-readable media having computer-useable instructions embodied thereon for performing a method to identify force measurements for user interaction with a touch screen on a computing device are provided. The computing device receives interactions from a user. In turn, force measurements for the user interactions are generated by stress sensors mounted on the touch screen of the computing device. The generated force measurements are associated with computing tasks for applications executing on the computing device. A database in the computing device stores the generated force measurements and the computing tasks with an identifier for the user.

BRIEF DESCRIPTION OF THE SEVERAL VIEWS OF THE DRAWINGS

Illustrative embodiments of the invention are described in detail below with reference to the attached drawing figures, which are incorporated by reference herein and wherein.

DETAILED DESCRIPTION

Embodiments of the invention provide methods, media, and systems for detecting force measurements for user interactions with a computing device and executing computing tasks based on the detected force measurements. The computing device may provide efficient entry of text for numerous languages, simplified formatting, and reductions in a quantity of interactive graphical content displayed on the computing device. A database stores the detected force measurement for each user that interacts with the computing device and allows subsequent interactions matching the stored force measurements to trigger the appropriate computing tasks for the corresponding user.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

As utilized herein, the term "component" means any combination of hardware, software, and firmware.

A computing environment may include computing devices that have touch screens. The touch screens on the computing devices may allow a user to enter text, zoom-in, zoom-out, autocomplete, enter accents, enter non-English text, capitalize letters, make selections, and quickly complete numerous other computing tasks. The touch screens on the computing devices may generate force measurements that trigger the computing task. In some embodiments, the computing device may include databases that store force measurements and corresponding computing tasks to reduce the complexity of interacting with the touch screen to initiate the computing tasks.

Figure 1:
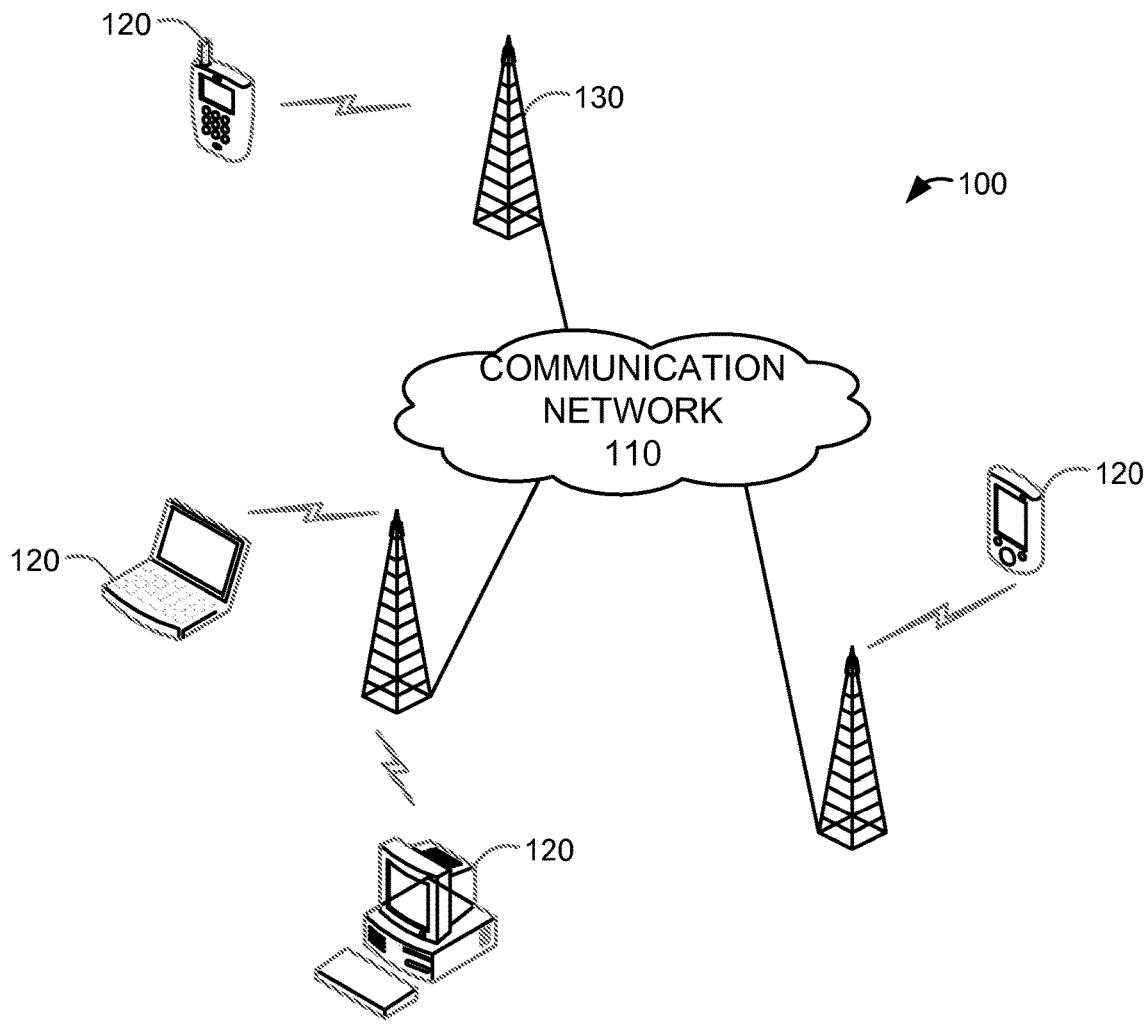
FIG. 1 is a network diagram illustrating an exemplary computing environment, according to embodiments of the invention.

FIG. 1 is a network diagram illustrating an exemplary computing environment, according to embodiments of the invention. The computing environment 100 may include a communication network 110, computing devices 120, and base stations 130.

The communication network 110 may be a wired network or wireless network. The communication network 110 may include a local area network, a wide area network, and the Internet. In some embodiments, the communication network 110 connects base stations 130 to each other. The communication network 110 transmits messages generated by computing devices 120 and received by the base stations 130. Accordingly, the communication network 110 allows the computing devices 120 to communicate with each other.

The computing devices 120 are user operated devices that generate messages for transmission across the communication network 110 to other computing devices 120. The computing devices 120 include mobile devices, laptops, personal computers, personal digital assistants, or any other device that requires user interaction. A user interacts with the computing devices 120 by one or more input interfaces. For instance, a user may interact with a microphone, a keypad, a keyboard, a touch screen, or any other suitable input interface connected to the computing device 120. The touch screen may be a multi-sensing capacitive interface having capacitive sensors, stress sensors, or resistive sensors. In an embodiment, the touch screen may include sensors that generate proximity, position, and force measurements. The proximity measurements may provide a measurement for the amount of space between the fingers and the surface of the touch screen. The position measurements provide an indication of where the finger contacted the surface within the physical boundaries of the touch screen. The force measurements provide an indication of a force level for each finger that contacts the surface of the touch screen. In an alternate embodiment, the force levels for each finger may be based on a quantity of distorting of a touch shape associated with the finger.

The computing devices 120 process the user interactions received from the input interface to perform computing tasks that corresponds to the user interaction. The computing tasks comprise sending email, printing a document, initiating a phone call, or any other suitable computing task on the computing devices 120.

The base stations 130 connect to the communication network 110. The base stations 130 communicate with the computing devices 120 to route communication messages across the communication network 110 to other computing devices 120. The communication message may include electronic mail, text data, voice data, or video data. In some embodiments, the base stations 130 may wirelessly receive the communication messages from the computing devices 120.

An artisan of ordinary skill appreciates and understands that the computing environment 100 has been simplified and that alternate arrangements are within the scope and spirit of this description.

In an embodiment, a computing device receives user interactions on a touch screen. The user may interact with the touch screen by using one or more fingers. When the one or more fingers are proximate to, or contact, the touch screen, a user interaction is received by the touch screen and a computing task associated with user interaction is initiated.

Figure 2:
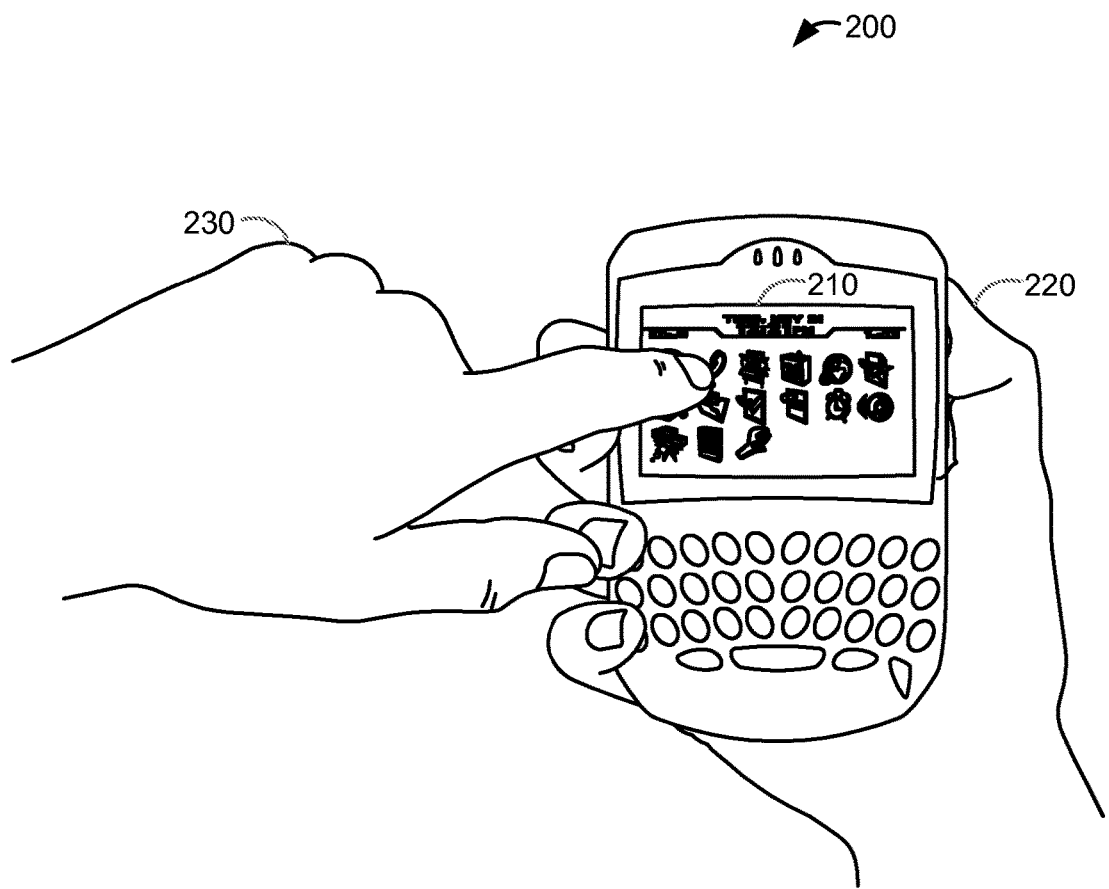
FIG. 2 is a perspective diagram illustrating a computing device that receives interactions on a touch screen, according to embodiments of the invention.

FIG. 2 is a perspective diagram illustrating a computing device 200 that receives interactions on a touch screen 210, according to embodiments of the invention.

The touch screen 210 on the computing device 200 is cradled by hand 220, and fingers from hand 230 interact with the touch screen 210. Hand 220 may cradle the device to stabilize the touch screen 210 when the user is interacting with the touch screen 210 with hand 230. One or more fingers of hand 230 may be used to interact with touch screen 210. In turn, the touch screen 210 may initiate computing tasks when the fingers are within a predefined proximity of the touch screen 210 and the fingers contact appropriate regions of the touch screen 210 with an expected level of force.

The touch screen 210 may also generate a touch event when the one or more fingers contact the touch screen 210 and create a quantity of distortion for a touch shape corresponding with the one or more fingers that contact the touch screen 210. The touch screen 210 may capture touch shapes for each user interaction and initiate computing tasks based on the distortions of the computing shape. In some embodiment, the touch screen 210 may generate a biometric profile for each finger that contacts the touch screen 210. The biometric profile may comprise a size of each finger of the user interacting with the computing device, a size of a fingertip on each finger, a touch shape for each finger, a print for each finger, an identifier for the portion of the finger that interacts with the touch screen 210, and an identifier for the user that interacts with the touch screen 210 via the fingers. A biometric profile of each user that interacts may be stored on the computing device.

In certain embodiments, the computing device 200 is configured to generate force measurements, or capture distortions of touch shapes. The computing device 200 uses the force measurements or distortions to the touch shapes to initiate a computing task. The computing device 200 may monitor the user interactions to develop a historical log of the user interaction and initiated computing tasks.

Figure 3:
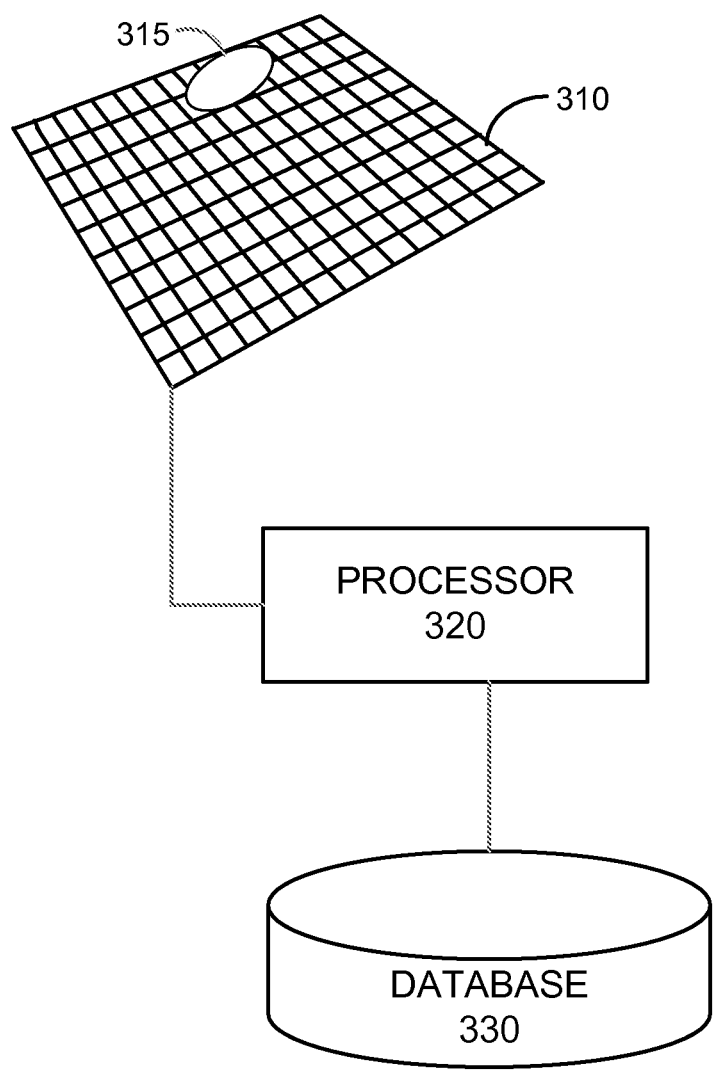
FIG. 3 is a block diagram illustrating exemplary components of the computing device that captures the touch shapes, or generates force measurements, of the user interactions, according to embodiments of the invention.

FIG. 3 is a block diagram illustrating exemplary components of the computing device that captures the touch shapes, or generates force measurements, of the user interactions, according to embodiments of the invention. The components include a touch screen 310, a processor 320, and a database 330.

The touch screen 310 connects to the processor 320. The touch screen 310 receives user interactions that initiate computing tasks. In an embodiment, the touch screen 310 includes sensors that measure position, force, and proximity. The database 330 may store the measurements for position, force, and proximity and the corresponding computing task initiated by the user interaction. In other embodiments, the sensors close to the region of the user interaction captures a touch shape 315, a touch size, a size of a fingertip on the finger that interacts with the touch screen, a fingerprint signature associated with the finger, and an identifier for the portion of the finger that interacts with the touch screen 310. The touch shape 315, touch size, or fingerprint signature may also initiate a computing task on the device. Additionally, the database 330 may store the captured touch shape 315, touch size, size of the fingertip on the finger that interacts with the touch screen, the fingerprint signature associated with the finger, and the identifier for the portion of the finger that interacts with the touch screen 310 with the corresponding computing task initiated by the user interaction.

The processor 320 receives finger data which includes, but is not limited to, the touch shape 315, the touch size, the size of a fingertip on the finger that interacts with the touch screen, a fingerprint signature associated with the finger, and an identifier for the portion of the finger that interacts with the touch screen 310. Also, the processor 320 receives the measurements for position, force, and proximity from the touch screen 310. The processor 320 may use the force measurements or finger data to generate a scale of force levels that correspond to the initiated computing tasks.

In an embodiment, the processor 320 may monitor the user interactions over a period of time to generate a range of force measurements that are generated by the touch screen 310. A range for the scale of force levels may be based on values of the force measurements. The force level for the user interactions may include large force, medium force, or low force. The largest force measurement may be identified as a large force, the lowest force measurement may be identified as low force, and the force measurement that is a mean of the largest force measurement and lowest force measurement may be identified as medium force by the processor 320. Each identified force level may be associated with a different computing task and stored in the database 330. For instance, a large force may initiate a capitalization of text entry, a medium force level may initiate diacritics for text entry, and low force may initiate lowercase text entry. The scale of force levels may be different for each user that interacts with the computing device. The processor 320 may also store an identifier for the user with each force level. In some embodiments, the database 330 may be updated when the range of force measurements for a user are altered to include larger force measurements or lower force measurements than any of the previously received force measurements for the user from the touch screen 310.

In another embodiment, the processor 320 may monitor the user interactions over a period of time to determine a quantity of distortion for touch shapes 315 that are captured by the touch screen 310. A range for the scale of force levels may be based on the quantity of distortion of the touch shapes 315 for the user interaction. Generally, the touch shape 315 for a user interaction is captured as an oval with clearly defined edges. This touch shape 315 may become distorted when a user increases the force applied to the touch screen. As the force increases, the edges of the oval may become distorted and the oval may become rounder. For instance, when an index finger interacts with the touch screen 310, a touch shape 315 corresponding to the index finger is captured by the touch screen 310. As more surface area of the index finger contacts the touch screen 310, the captured touch shape 315 is distorted at edges but the shape is relatively the same as the shape of the index finger. The quantity of distortion of touch shapes 315 for the fingers that interact with the touch screen 310 are monitored by the processor 320 to infer force levels for the user interaction. The distortions in the touch shape 315 are captured by the touch screen 310 and are associated with varying force levels. The scale of force level for the user interactions may include large force, medium force, or low force. The processor 320 may identify a touch shape 315 having an oval shape and clearly defined edges as a low force. The processor 320 may identify a touch shape 315 having an semi-circular shape and blurred edges as a high force. The processor 320 may identify a touch shape 315 having a circular shape and defined edges as a medium force. Each finger that interacts with the touch screen 310 may have identified force levels that are stored in the database 330 with an identifier for the finger. The identified force levels may be associated with different computing tasks and stored in the database 330. For instance, a large force may initiate a non-English text entry, a medium force level may initiate zoom-in, and low force may initiate rotation. The distortions of the touch shape 315 may be different for each user that interacts with the computing device. The processor 320 may also store an identifier for the user with each force level in the database 330. In some embodiments, the database 330 may be updated when the quantity of distortion that represent changes in the touch shape 315 differ from any of the previously received changes in the touch shape 315 for the user from the touch screen 310.

The database 330 stores force measurements and finger data that are used by the processor 320 to initiate an appropriate computing task for the user interaction with the touch screen 310. The database 330 associates the previously-identified force measurements and finger data with identifiers that uniquely identify the user interacting with the touch screen 310. In some embodiments, the identifiers that uniquely identify the user may include a username and password. The database 330 may also associate the biometric profile of the user with the identifiers that uniquely identify the user. The database 330 associates computing tasks for each application on the computing device with varying force levels. In some embodiments, the processor 320 searches the database 330 to locate stored force levels that match the force levels for a user interaction. In turn, the processor 320 retrieves the computing task corresponding to the matching stored force level and initiates the computing task.

In an embodiment, the database 330 is updated as the user interacts with touch screen 310. The database 330 may be updated to include information for additional users, to reflect changes in the force measurements, or to reflect changes in distortion to the touch shapes 315. The previously-identified force measurements and finger data corresponding to the user interaction with the touch screen 310 is fed back into the database 330 to learn changes in current user interaction with the touch screen 310. In some embodiments, the data corresponding to ergonomic studies are updated with the previously-identified force measurements and finger data.

The computing device monitors the touch screen to determine a range for the force measurements for fingers that interact with the touch screen. The range of values is utilized by the computing device to identify force levels for the user interaction. The computing device associates and stores computing tasks with the force levels in a database. In turn, a user interaction received by the computing device having a force level matching a stored force level may trigger a computing task.

Figure 4:
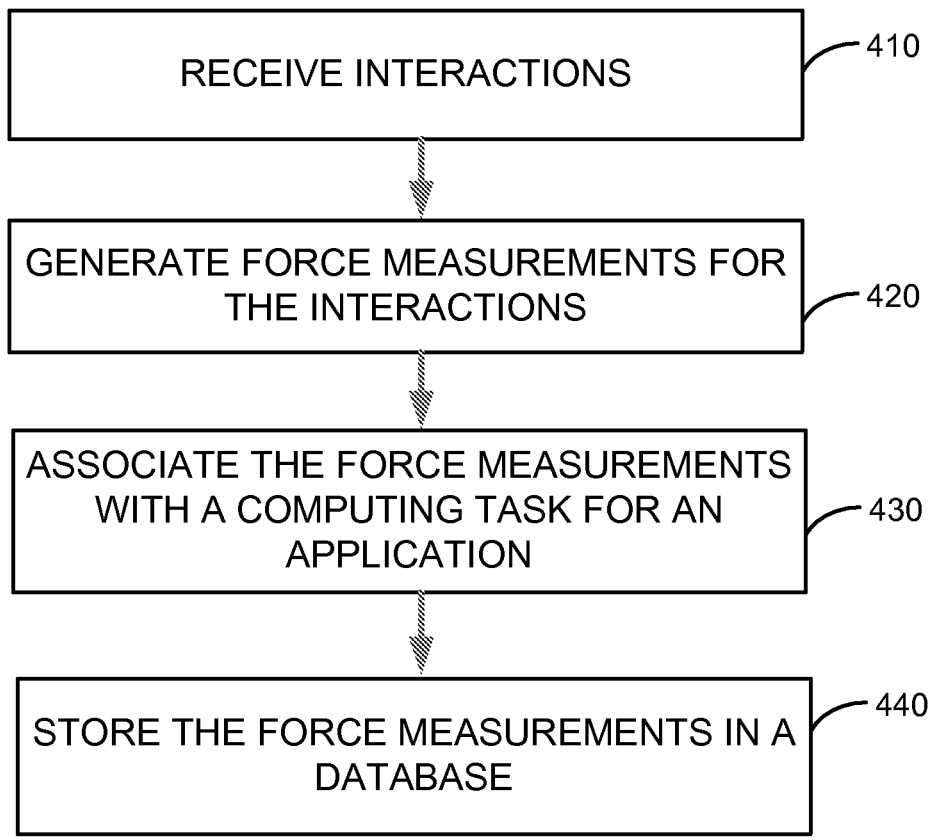
FIG. 4 is a logic diagram illustrating an exemplary method to identify force levels based on user interaction on a touch screen, according to embodiments of the invention.

FIG. 4 is a logic diagram illustrating an exemplary method to identify force levels based on user interaction on a touch screen, according to embodiments of the invention.

In step 410, the computing device receives interactions from a user on the surface of the touch screen. In certain embodiments, the touch screen is associated with a stress sensor. In step 420, the computing device generates force measurements for the user interactions. In turn, the computing device, in step 430, associates the force measurements with computing tasks for an application on the computing device. In step 440, the computing device stores the force measurements and the computing tasks in a database with an identifier for the user.

In an alternate embodiment, the computing device monitors the touch screen to determine a range for distortions to touch shapes for fingers that interact with the touch screen. The range of distortions to the touch shapes is utilized by the computing device to identify force levels for the user interaction. The computing device may associate and store computing tasks with distortions of the touch shapes and force levels in a database. In turn, a user interaction with a finger received by the computing devices having a distortion of touch shape matching a stored distortion of the touch shape for the finger may trigger a computing task.

Figure 5:
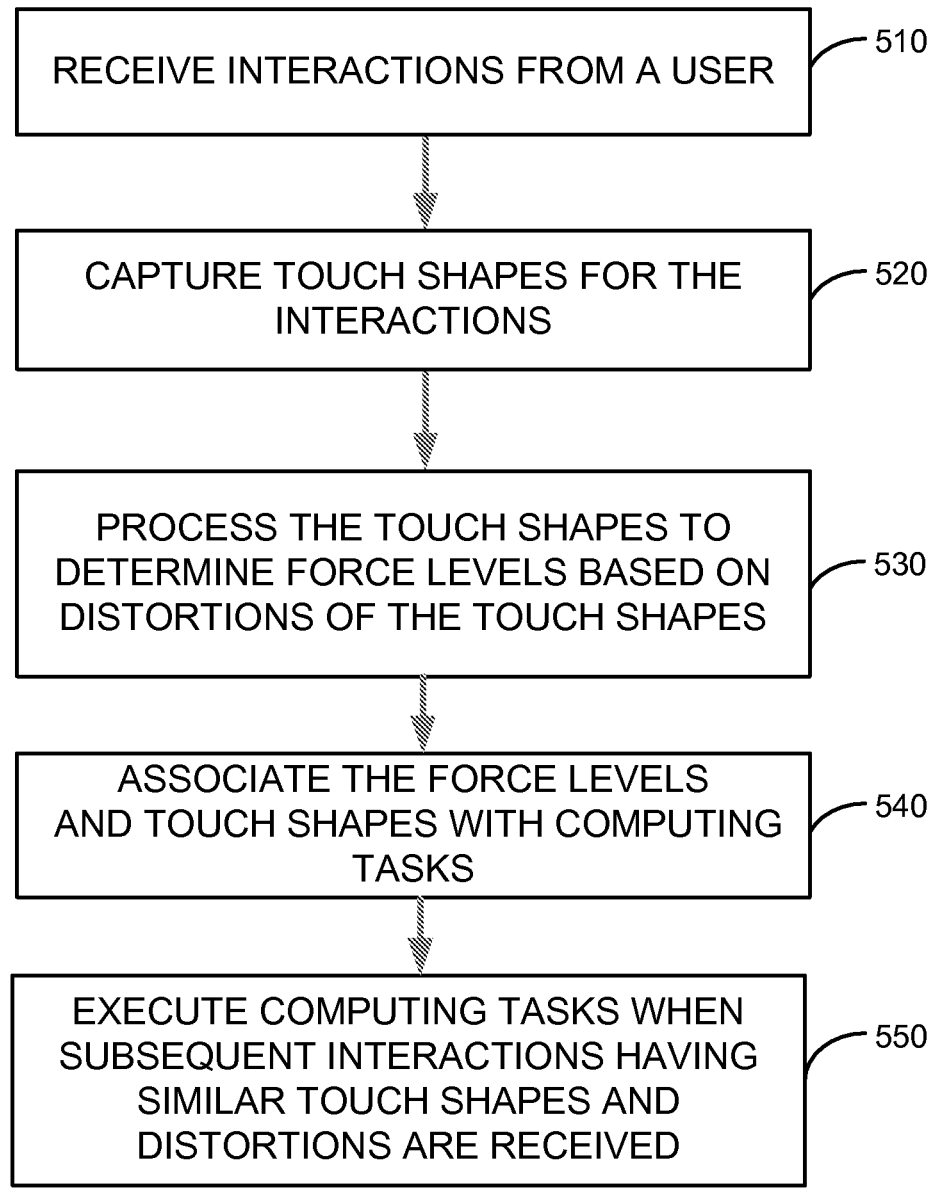
FIG. 5 is a logic diagram illustrating an exemplary method to detect distortions on a touch screen that trigger computing tasks, according to embodiments of the invention.

FIG. 5 is a logic diagram illustrating an exemplary method to detect distortions on a touch screen that trigger computing tasks, according to embodiments of the invention.

In step 510, the computing device receives interactions from a user. In certain embodiments, the touch screen is associated with a finger scanner. In step 520, the computing device captures touch shapes for the user interactions. In turn, the computing device, in step 530, processes the touch shapes to determine force levels based on distortions of the touch shapes. In step 540, the computing device associates the force levels and touch shapes with computing tasks. In step 550, the computing device executes the computing tasks when subsequent user interactions having similar touch shapes and distortions to the touch shape are received by the touch screen.

In summary, a computing device having one or more computer-readable media programmed with instructions to initiate a computing task based on the force levels of the user interaction may utilize a database of previously-received interactions and corresponding force levels to select and initiate the computing task. The computing device may communicate with the database to identify each user that interacts with the computing device. Additionally, the computing device may periodically update the database when the range of force measurements or distortions of touch shape for the identified user falls outside the range for force measurements stored for the user in the database or outside the range for distortions to the touch shape stored for the user in the database.

Other arrangements of the various components depicted, as well as components not shown, are possible without departing from the spirit and scope of this description of the embodiments of the invention. Alternative embodiments that do not depart from the scope of this description will become apparent to those skilled in the art. A skilled artisan may develop alternative means of implementing the aforementioned improvements without departing from the scope of this description of the embodiments of the invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A method for identifying force levels for a plurality of user interactions with a touch screen on a computing device, the method comprising:
    receiving a first set of interactions from one or more fingers of a first user on the surface of the touch screen through a multi-sensing capacitive interface with sensors mounted on the touch screen;
    generating associated first force measurements having a range for the first set of interactions;
    determining a plurality of first user-specific force levels based on the range of the associated first force measurements for the first set of interactions;
    subsequently receiving a second set of interactions from one or more fingers of a second user on the surface of the touch screen;
    generating associated second force measurements having a range for the second set of interactions;
    determining a plurality of second user-specific force levels based on the range of the associated second force measurements for the second set of interactions; and
    storing the associated first and second force measurements, the determined plurality of first and second user-specific force levels, and a computing task associated with each of the first and second user-specific force levels in a database along with an associated first and second biometric profile of the first and second user, respectively.

2. The method of claim 1, further comprising:
    receiving a subsequent interaction from one of the first user and the second user on the touch screen;
    retrieving the stored first and second force measurements;
    determining whether the received subsequent interaction was received from the first user or the second user; and
    executing an associated computing task based upon said determining.

3. The method of claim 2, wherein the associated computing task comprises autocomplete, capitalization, entering accents, and entering non-English text.

4. The method of claim 1, wherein the associated first and second biometric profile each comprise one or more of a finger size, a fingertip size, a finger shape, and a finger print of the associated first and second user.

* * * * *